US012080946B2

(12) United States Patent
Chisum et al.

(10) Patent No.: US 12,080,946 B2
(45) Date of Patent: Sep. 3, 2024

(54) LENS ANTENNA SYSTEMS AND METHOD

(71) Applicant: University of Notre Dame du Lac, South Bend, IN (US)

(72) Inventors: Jonathan Chisum, South Bend, IN (US); Nicolas Garcia, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 320 days.

(21) Appl. No.: 17/721,898

(22) Filed: Apr. 15, 2022

(65) Prior Publication Data

US 2023/0011824 A1 Jan. 12, 2023

Related U.S. Application Data

(60) Provisional application No. 63/175,734, filed on Apr. 16, 2021.

(51) Int. Cl.
*H01Q 13/02* (2006.01)
*H01Q 19/06* (2006.01)

(52) U.S. Cl.
CPC .................................. *H01Q 19/062* (2013.01)

(58) Field of Classification Search
CPC ............................. H01Q 19/062; H01Q 13/02
See application file for complete search history.

(56) References Cited

U.S. PATENT DOCUMENTS 3,835,469 A 9/1974 Chen et al.
3,958,246 A * 5/1976 Wohlers .................. H01Q 3/46 342/6
4,825,216 A 4/1989 Dufort
5,003,314 A 3/1991 Berkowitz et al.
6,075,497 A 6/2000 Chen et al.
6,977,622 B2 12/2005 Hay et al.
7,428,093 B2 9/2008 Tegreene et al.
8,576,132 B2 11/2013 Lier
9,490,280 B2 11/2016 Sertel et al.
(Continued)

OTHER PUBLICATIONS

Campbell et al., "Symmetrically Truncated Right-Angle Corners in parallel plate and Rectangular Waveguides," IEEE Transactions on Microwave Theory and Techniques, vol. 16, No. 8.
(Continued)

*Primary Examiner* — Awat M Salih
(74) *Attorney, Agent, or Firm* — Greenberg Traurig, LLP

(57) ABSTRACT

An electromagnetic antenna includes a channel configured to serve as a waveguide for electromagnetic radiation, a first and second feed disposed next to each other inside the channel at a first end thereof, the first and second feed being configured to radiate electromagnetic waves into the channel, an aperture lens disposed inside the channel near a second end thereof opposite to the first end, the aperture lens being configured to output collimated beams, a first focal lens disposed inside the channel adjacent to an outlet of the first feed, the first focal lens being configured to squint a beam radiated from the first feed toward a center of the aperture lens, and a second focal lens disposed inside the channel adjacent to an outlet of the second feed, the second focal lens being configured to squint a beam radiated from the second feed toward the center of the aperture lens.

20 Claims, 9 Drawing Sheets

(56) References Cited

U.S. PATENT DOCUMENTS

| | | | | |
|---|---|---|---|---|
| 9,876,282 | B1 * | 1/2018 | Izadian | G01S 7/03 |
| 10,276,944 | B1 * | 4/2019 | Izadian | H01Q 21/068 |
| 2018/0183152 | A1 | 6/2018 | Turpin et al. | |
| 2020/0119811 | A1 | 4/2020 | Kay et al. | |
| 2020/0144719 | A1 | 5/2020 | Scarborough et al. | |

OTHER PUBLICATIONS

Garcia et al., "High-Efficiency, Wideband GRIN Lenses With Intrinsically Matched Unit Cells," IEEE Trans. Antennas Propag., vol. 68, pp. 5965-5977, Aug. 2020.

Garcia et al., "Reduced dimensionality optimizer for efficient design of wideband millimeter-wave 3D metamaterial GRIN lenses," Microw. Opt. Techn. Lett., vol. 63, No. 5, pp. 1372-1376, 2021.

Lu et al., "Fully Metallic Anisotropic Lens Crossover-in-Antenna Based on parallel plate Waveguide Loaded With Uniform Posts," IEEE Transactions on Antennas and Propagation, vol. 68, No. 7.

Rao, "Multifocal three-dimensional bootlace lenses," in IEEE Transactions on Antennas and Propagation, vol. 30, No. 6, pp. 1050-1056, Nov. 1982.

Rappaport et al., "Optimized three-dimensional lenses for wide-angle scanning," in IEEE Transactions on Antennas and Propagation, vol. 33, No. 11, pp. 1227-1236, Nov. 1985.

Rotman et al., "Wide-angle microwave lens for line source applications," in IEEE Transactions on Antennas and Propagation, vol. 11, No. 6, pp. 623-632, Nov. 1963.

Soumitra Biswas et al., "High gain, wide-angle QCTO-enabled modified Luneburg lens antenna with broadband anti-reflective layer," Nature Sci. Rep., vol. 10, No. 1, 2020.

* cited by examiner

LENS ANTENNA SYSTEMS AND METHOD

CROSS-REFERENCE TO RELATED APPLICATIONS

This application claims priority to U.S. Provisional Application No. 63/175,734 filed on Apr. 16, 2021 and entitled "COMPOUND LENSES FOR IMPROVING BEAM-SCAN PERFORMANCE", and is herein incorporated by reference in its entirety.

STATEMENT REGARDING FEDERALLY SPONSORED RESEARCH OR DEVELOPMENT

This invention was made with government support under N00014-20-C-1067 awarded by the Office of Naval Research (ONR) and N00173-16-D-2009 awarded by the U.S. Naval Research Laboratory (NRL). The government has certain rights in the invention.

BACKGROUND

Beam-scanning gradient-index (GRIN) lenses are quickly becoming a viable technology in the 5G and MMW communications applications spaces due to their low-power beamforming capabilities. However, the common switched-feed beamforming approach tends to result in undesirable scan loss for high scan angles. This is ultimately because the easiest and most straightforward feeding scheme—wherein the feeds are uniformly oriented and placed on a flat focal plane—is generally different from the most effective feeding scheme wherein feeds are placed on a curved surface beneath the lens and oriented individually toward the lens. Feeds in the former case generate worse collimation due to their displacement from the Petzval surface and suffer from high spillover loss due to uniform orientation. These non-idealities manifest in the far field as beam-widening, coma lobe, and reduced gain.

Lens antennas typically achieve beam scan by switching between various feed elements distributed across a focal plane below the lens. However, excessive scan-loss occurs toward the edges of the lens (corresponding to extreme scan angles). This is caused by significant spillover from feeds near the edge of the lens and from aperture phase distortion due to imperfect phase collimation. These issues are exacerbated if feed elements must lie in a flat plane differing from the optimal Petzval focal surface.

It is desirable then to synthesize GRIN systems that intrinsically address the flat-feeding handicap.

SUMMARY

An electromagnetic antenna is disclosed which includes a channel configured to serve as a waveguide for electromagnetic radiation, a first and second feed disposed next to each other inside the channel at a first end thereof, the first and second feed being configured to radiate electromagnetic waves into the channel, an aperture lens disposed inside the channel near a second end thereof opposite to the first end, the aperture lens being configured to output collimated beams, a first focal lens disposed inside the channel adjacent to an outlet of the first feed, the first focal lens being configured to squint a beam radiated from the first feed toward a center of the aperture lens, and a second focal lens disposed inside the channel adjacent to an outlet of the second feed, the second focal lens being configured to squint a beam radiated from the second feed toward the center of the aperture lens.

In an embodiment, the waveguide channel is formed by two closely spaced-apart parallel plates. The parallel plates are exemplarily spaced apart by less than 1λ wherein λ is a wavelength of a radiation by the electromagnetic antenna.

Figure 1:
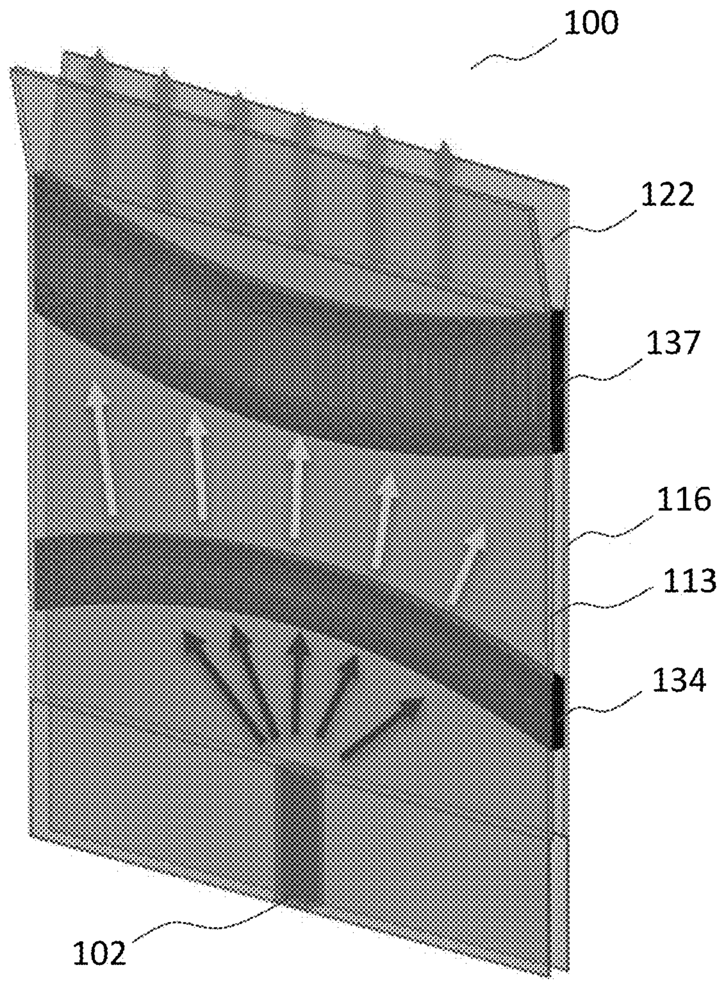
FIG. 1 is a perspective view of a compound GRIN lens fanbeam antenna in accordance with an embodiment of the present disclosure.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DETAILED DESCRIPTION

The following description of example methods and apparatus is not intended to limit the scope of the description to the precise form or forms detailed herein. Instead the following description is intended to be illustrative so that others may follow its teachings.

The present disclosure describes a compound GRIN lens system wherein two or more GRIN lenses are employed. The compound lens approach in general increases the degrees of freedom and is common in optical applications. Furthermore, by using only GRIN media in all lens components, the total weight and dielectric loss of the system can be minimized. Design and 3D fullwave simulation results of a two-lens GRIN antenna are disclosed hereinafter.

FIG. 1 is a perspective view of a compound GRIN lens fanbeam antenna 100 in accordance with an embodiment of the present disclosure. The antenna 100 includes two parallel plates 113 and 116 spaced apart by a predetermined distance as waveguide. As such waveguide turns a three-dimensional radiation pattern into a two-dimensional form, the predetermined distance is preferably less than 1λ, where λ is a wavelength of the radiative signal the antenna 100 is designed to operate. As an example, the antenna 100 has a width of 152.4 mm and a length 171 mm and the parallel plates 113 and 116 is spaced apart by 3.6 mm.

As shown in FIG. 1, an exemplary signal feed 102 is sandwiched between the parallel plates 113 and 116 at a first end of the antenna 100. In practice, multiple feeds may be sandwiched between the parallel plates 113 and 116 to form a feed array with a uniform feed orientation.

As shown in FIG. 1, a focal lens 134 and an aperture lens 137 are also sandwiched between the parallel plates. The focal lens 134 is disposed in a middle of the antenna 100 as a first lens to modulate electromagnetic radiation from the signal feed 102. The focal lens 134 has a first curved permittivity profile to provide squinting for offsetting feeds and flattening focal surface.

The aperture lens 137 is disposed near a second end of the antenna 100 opposite to the first end. The aperture lens 137 has a second curved permittivity profile to further modulate the electromagnetic radiation beams after the focal lens 134. The aperture lens 137 provides bulk of phase collimation.

As shown in FIG. 1, the feed 102 radiates uncollimated rays. The focal lens 134 turns the uncollimated rays into partially collimated rays (rays still spreading, but less so). Then the aperture lens 137 turn the partially collimated rays into fully collimated rays (traveling in a same direction).

As shown in FIG. 1, the antenna 100 include an exemplary flared outlet at the second end to amplify the signal. As an example, the flared outlet has an opening of 15 mm expanded from a space of 3.6 mm.

Figure 2:
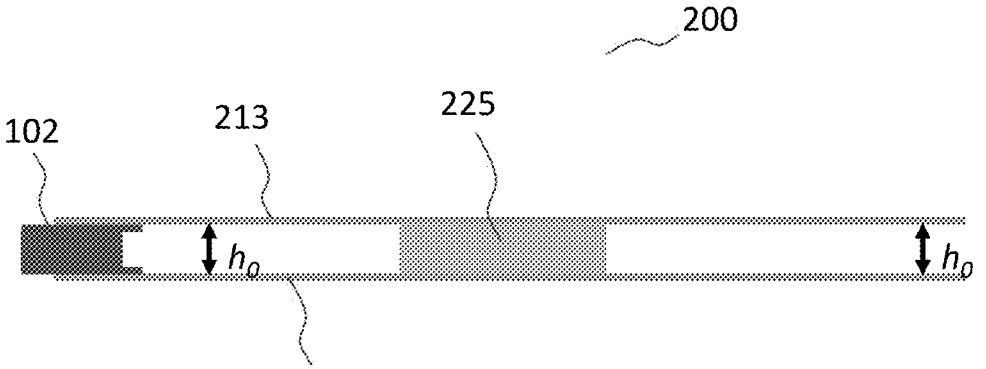
FIG. 2 is a cross-sectional view of a lens antenna in accordance with an embodiment of the present disclosure.

FIG. 2 is a cross-sectional view of a lens antenna 200 in accordance with an embodiment of the present disclosure. The lens antenna 200 includes parallel plates 213 and 216 with a feed 102 sandwiched therebetween at a first end of the lens antenna 200. The parallel plates 213 and 216 are spaced apart by $h_0$ uniformly throughout their entire length, where $h_0$ is exemplarily less than 1λ, and preferable less than 0.8λ. In an embodiment, the lens antenna 200 employs only one lens 225 disposed in the middle section of the parallel plates 213 and 216.

Figure 3:
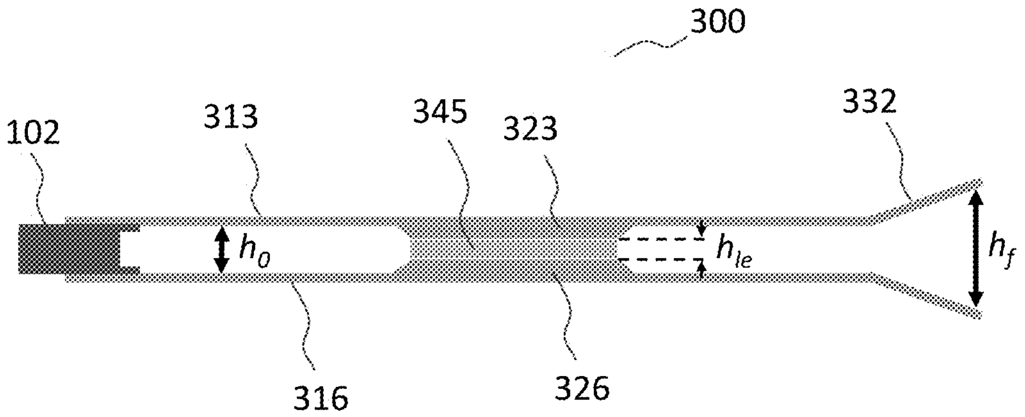
FIG. 3 is a cross-sectional view of a lens antenna in accordance with another embodiment of the present disclosure.

FIG. 3 is a cross-sectional view of a lens antenna 300 in accordance with another embodiment of the present disclosure. The lens antenna 300 includes parallel plates 313 and 316 spaced apart by a distance $h_0$. The lens antenna 300 has a narrowed middle section at a location of a lens 345. The narrowed middle section is formed by an upper member 323 protruding from the upper plate 313 and a lower member 326 protruding from the lower plate 316. In an embodiment, the upper member 323 and the lower member 326 are symmetrical and reduces the middle section to a space of $h_{le}$. The lens antenna 300 exemplarily has a flared outlet 332 with an opening dimension of $h_f$, where $h_{le}<h_0<h_f$.

In embodiments, the spacing of the parallel plates 313 and 316 near the antenna aperture progressively increases to enhance the antenna gain. The spacing of the parallel plates 313 and 316 can also be locally increased near feed plane to accommodate larger or wideband feeds by strategically reducing the spacing in other sections, such the middle section of the antenna 300 as shown in FIG. 3.

Figure 4:
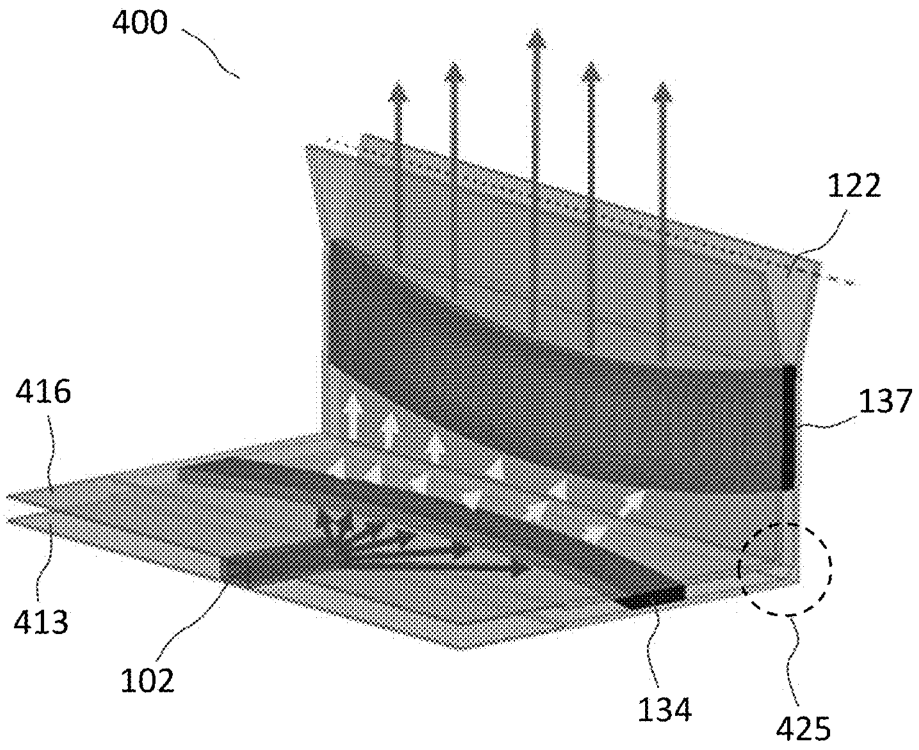
FIG. 4 illustrates a folded parallel plate configuration shown in FIG. 1 utilizing a 90° waveguide bend to reduce the on-axis depth of the antenna.

FIG. 4 illustrates a folded parallel plate configuration shown in FIG. 1 utilizing a 90° waveguide bend to reduce the on-axis depth of the antenna 400. Parallel plates 413 and 416 have an exemplary 90° bend at a location 425 between the focal lens 134 and the aperture lens 137. Due to the narrow space between the parallel plates 413 and 416 turns a three-dimensional waveform into a two-dimensional one, at least a transverse electromagnetic (TEM) mode radiation propagates through the bend unimpeded. In other embodiments, the parallel plates 413 and 416 can form a bend of any desired angle. The parallel plates can also be nested with other plates by properly bending more than one of the parallel plate antennas. It is also possible to include multiple bends, allowing for significant space savings by folding the feed upon itself.

In an embodiment, the parallel plates are spaced 3.6 mm apart such that only the desired transverse electromagnetic (TEM) mode propagates across the entire WR-28 band. The lens is fed with a WR-28 open ended waveguide (OEWG) and the feed is translated laterally along a flat focal line to achieve a beam scan. The parallel plate structure is exemplarily flared to 15 mm wide at the aperture in order to increase gain and reduce impedance mismatch at a freespace boundary. In the case of the folded parallel plate waveguide, a 45° mitered corner with gap size of 3.2 mm provides a wideband 90° transition.

Both parallel plate and folded parallel plate configurations are simulated in Empire XPU 3D full-wave FDTD software over 26-40 GHz.

Figure 5:
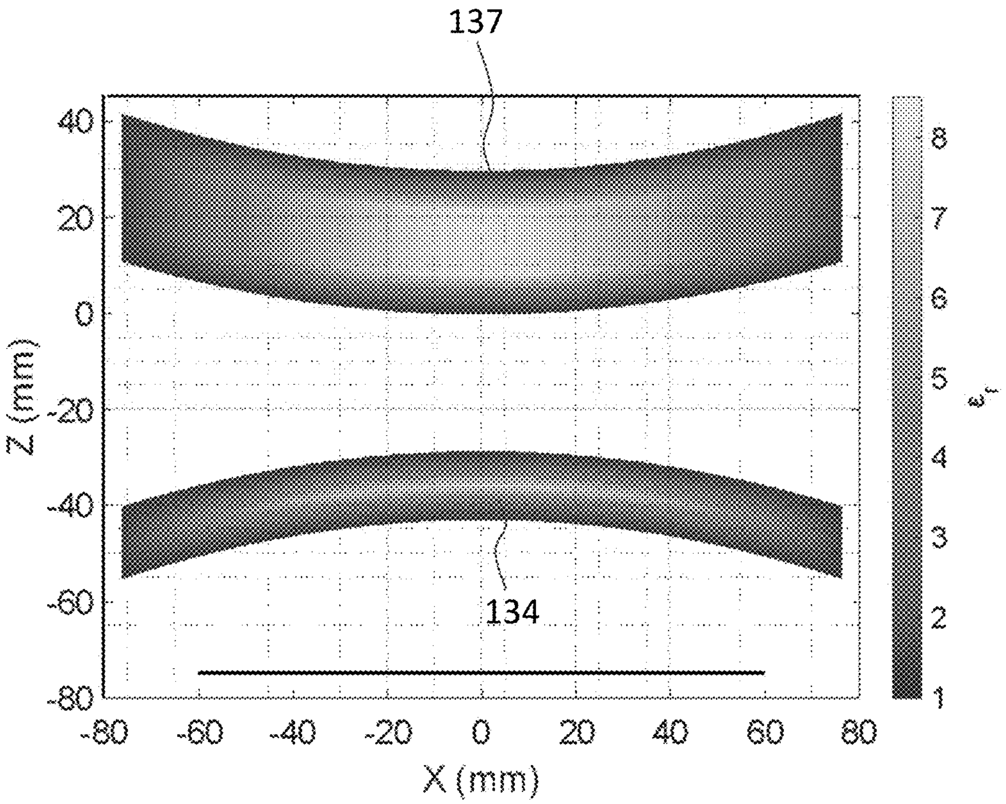
FIG. 5 illustrates permittivity profiles of the aperture lens and the focal lens.

FIG. 5 illustrates permittivity profiles of the aperture lens and the focal lens. The GRIN lens permittivity distributions are nominally based on a taper-core-taper design flow, and optimized using a 2D finite difference time domain (FDTD) solver. To maximize design freedom, the lens' core permittivity profiles and surfaces are optimized for peak gain over angle. In an embodiment, both lenses are 152.4 mm wide. The 'aperture' lens (at the aperture of the antenna) provides the bulk of the beam-shaping while the 'focal' lens (near the feed plane) provides beam-squinting for offset feeds while flattening the focal surface. The 'focal' lens is preferably disposed close to the feed plane in order to intercept feed radiation before it is lost to spillover. As an example, the focal lens 134 is substantially thinner than the aperture lens 137 due to its comparatively small contribution to the total collimation. As shown in FIG. 5, the focal lens 134 is approximately 12 mm thick while the aperture lens 137 is approximately 30 mm thick.

Figure 6A:
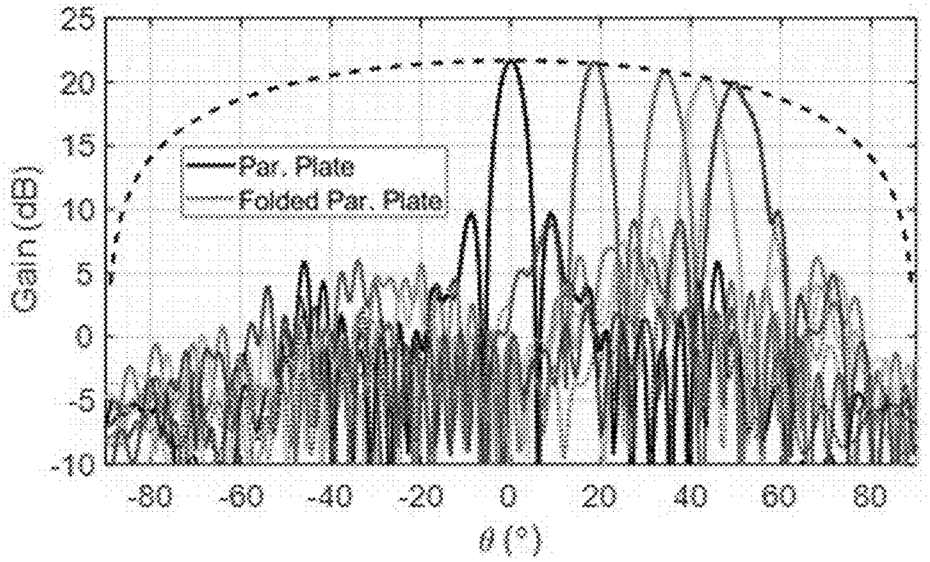
FIGS. 6A and 6B illustrate farfield gain patterns for 30 GHz and 40 GHz respectively.
Figure 6B:
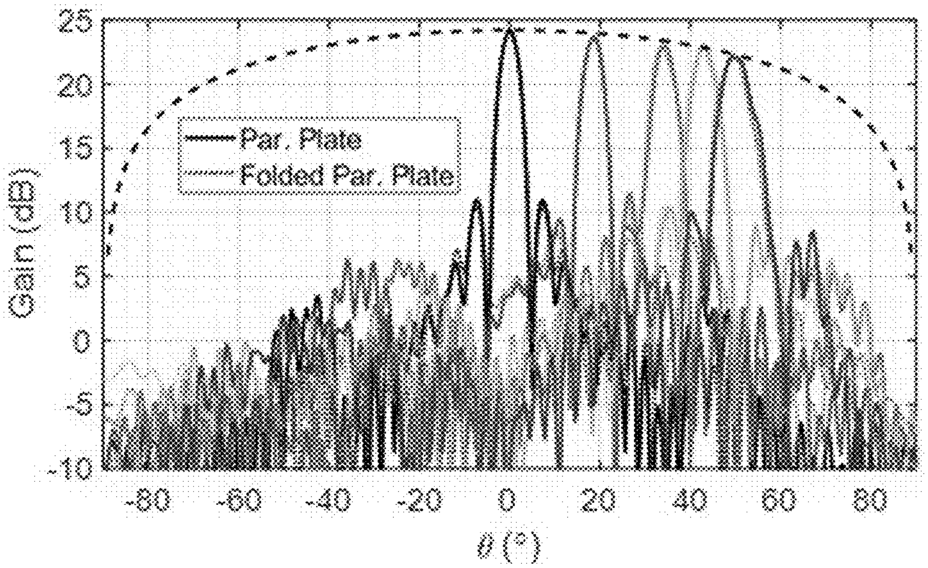

FIGS. 6A and 6B illustrate farfield gain patterns for 30 GHz and 40 GHz, respectively, with parallel plate results plotted solid lines and folded parallel plate results plotted dotted lines. Beam peaks are located at 0° (black solid line), 19° (blue solid line), 34° (purple solid line), 43° (yellow solid line), and 50° (red solid line). The parallel plate and folded parallel plate results agree extremely well, validating the profile-reduction method. For both lens configurations the beam-shape is maintained out to 50° with scan loss near 2 dB at both frequencies. For reference, a $\cos^1(\theta)$ scan loss envelope is provided in a dashed black trace. The beamscan results track this envelope reasonably well indicating that the compound GRIN lens system is achieving roughly the same degree of beam performance for all 0<±50°.

Figure 6C:
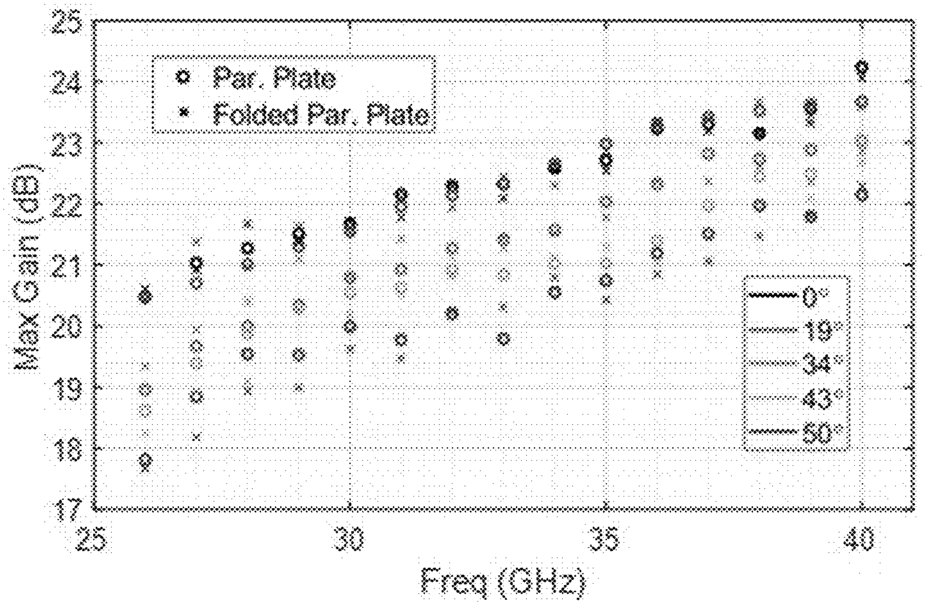
FIG. 6C illustrates peak gain values over angle and frequency for lens antenna systems shown in FIGS. 1 and 4.

FIG. 6C illustrates peak gain values over angle and frequency for the planer parallel plates 113 and 116 (represented by circle markers) and folded parallel plates 413 and 416 (represented by x markers) systems. The scan loss trends are consistent across the Ka-band for both configurations. The worst case scan loss envelope of $\cos^{1.4}(\theta)$ (2.7 dB at 50°) occurs at 26 GHz. Otherwise, the average maximum scan loss is 2 dB yielding a wideband scan loss envelope of $\cos^{1.1}(\theta)$. These results indicate that compound GRIN lens systems with simple feeding schemes have potential for high performance beamscan applications.

In order to significantly improve beamscan performance of lens antennas, a compound antenna system comprising an aperture lens and a focal lens serving as a feed-correction lenses (FCL) at every feed element is disclosed. The FCL is uniquely designed for each feed location in order to: i) squint the feed beam toward the center of the lens to reduce spillover, and ii) predistort the feed phase in order to correct aperture phase distortion and improve efficiency and gives rise to sidelobes (e.g., coma lobe).

Figure 7:
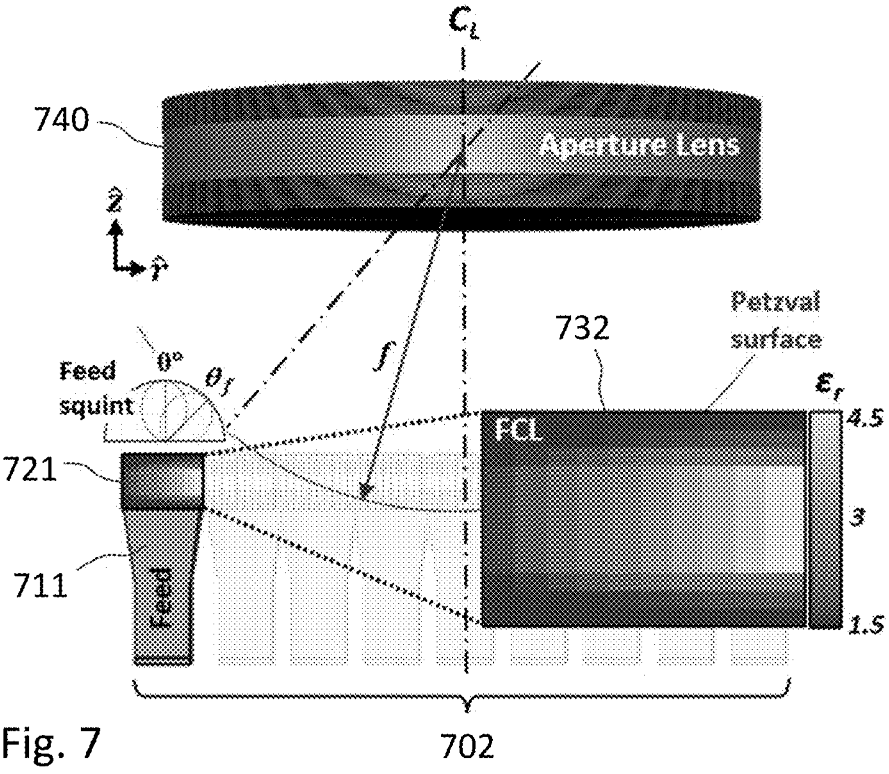
FIG. 7 illustrates a compound lens antenna system for use with a linear feed array in accordance with embodiments of the present disclosure.

FIG. 7 illustrates a compound lens antenna system for use with a linear feed array 702 in accordance with embodiments of the present disclosure. The linear feed array 702 is constrained to a constant $\hat{z}$-plane below the aperture lens at z=f, where f is the focal distance for only the central feed element. In addition, off-center feeds 711 are prohibited from tilting toward the center of the aperture lens. These constraints result in increased spillover loss and aperture phase distortion which increases scan loss and degrades the quality of the radiation pattern.

While multiple-focus aperture lenses can be designed such as the Rotman lens and other constrained lenses, they require feeds to be placed on specific non-planar surfaces and they are practically limited to 3 or 4 focal points. Since the FCL design decouples the feed correction from the aperture lens the lens system can be simultaneously optimized for every scan angle. The present disclose describes a reduction of spillover loss in which an FCL is designed for each feed location to squint the feed beam to an angle $\theta_f$, toward the center of the lens. A correction of aperture phase distortion with the FCLs is also possible.

As shown in FIG. 7, an exemplary 4" fanbeam aperture lens 740 with modest beam-scan capability is designed and simulated. A linear feed array 702 comprising 10 dBi horn antennas is constrained to a plane a distance f below the aperture lens center. A FCL 721 for a modest scan angle (27°) and extreme scan angle (49°) is designed. A cross-section view 732 of the FCL design shows that the permittivity ranges from 1.5 to 4.5. The FCL 721 includes a broadband matching layer on top and bottom to provide high performance across the WR28 band from 26.5 GHz to 40 GHz.

Figure 8A:
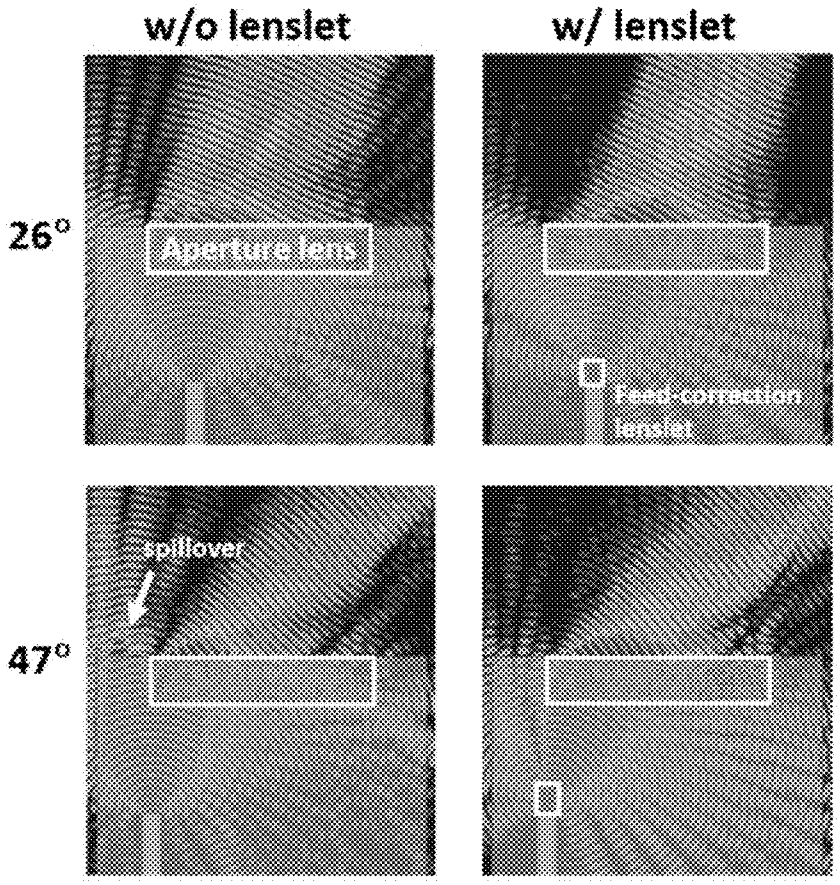
FIG. 8A shows full wave electromagnetic simulations (using Ansys HFSS) of both beam angles with and without feed correction focal lenslets (labeled "w/lenslet" and "w/o lenslet", respectively) at 40 GHz.

FIG. 8A shows full wave electromagnetic simulations (using Ansys HFSS) of both beam angles with and without feed correction focal lenslets (labeled "w/lenslet" and "w/o lenslet", respectively) at 40 GHz. The top and bottom rows correspond to the 27° and 47° beams, respectively.

Figure 8B:
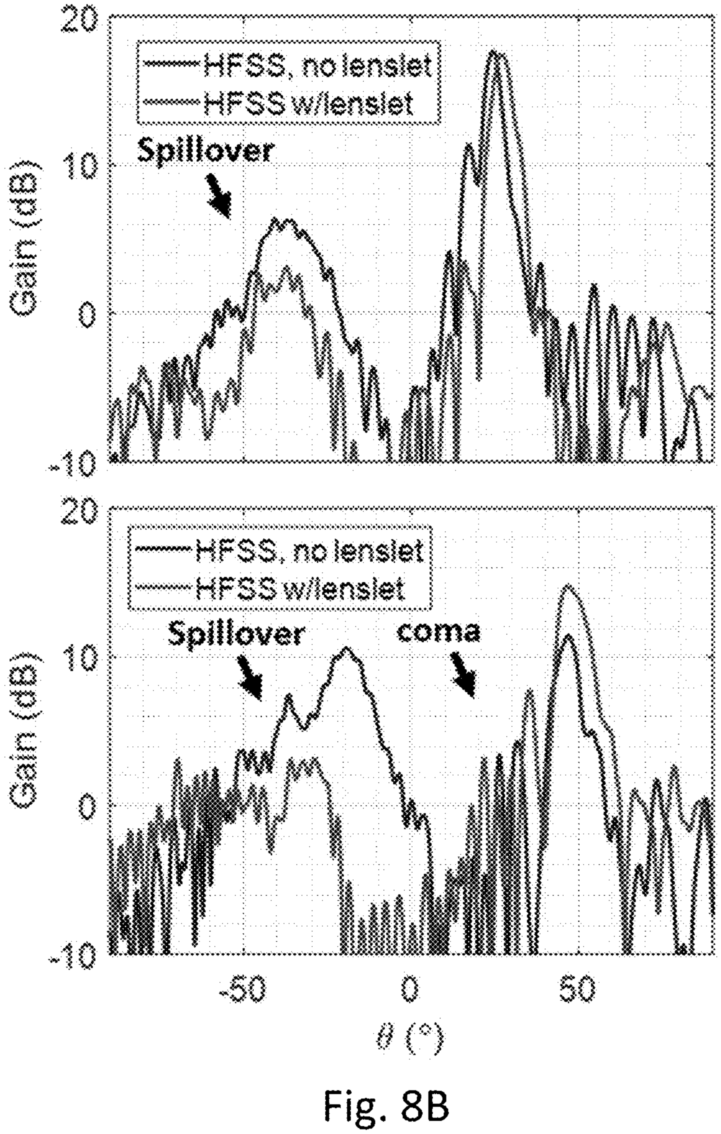
FIG. 8B shows a gain at 40 GHz in a φ=0 plane from θ=−90° to +90° for each beam angle with and without an FCL.

FIG. 8B shows a gain at 40 GHz in a φ=0 plane from θ=—90° to +90° for each beam angle with and without an FCL. For angles θ<0°, there is a significant rise in gain at undesired angles as a result of feed power spilling over the left side of the aperture lens. The spillover is more pronounced for the feed closest to the edge and corresponding to a beam angle of 47°. With the FCL present the power is squinted in toward the center of the lens and the spillover is reduced significantly. In the case of the 27° beam the spillover reduces from about 6.3 dB to 3.2 dB. For the 47° beam the spillover reduces from about 10.6 dB to 3.2 dB (reduced by more than 7 dB). For θ>90° it is notable that the coma distortion is significant for the 47° beam with the FCL present. As stated above, aperture phase distortion is not corrected with this FCL. The scanned beam at 27° has nearly identical gain in each case (17.5 dB) which is expected because spillover loss was already low without an FCL but the beam angle was shifted by a few degrees. The gain of the 47° beam increased from 11.5 dB to 14.8 dB, or by 3.3 dB. The calculated spillover efficiency of the squinted feed beam was 48.9% without an FCL and 81% with an FCL which accounts for a 2.2 dB increase in gain from just spillover improvement. The additional 1.1 dB is due to incidental phase correction across the lens aperture (despite their being pronounced coma distortion).

Figure 8C:
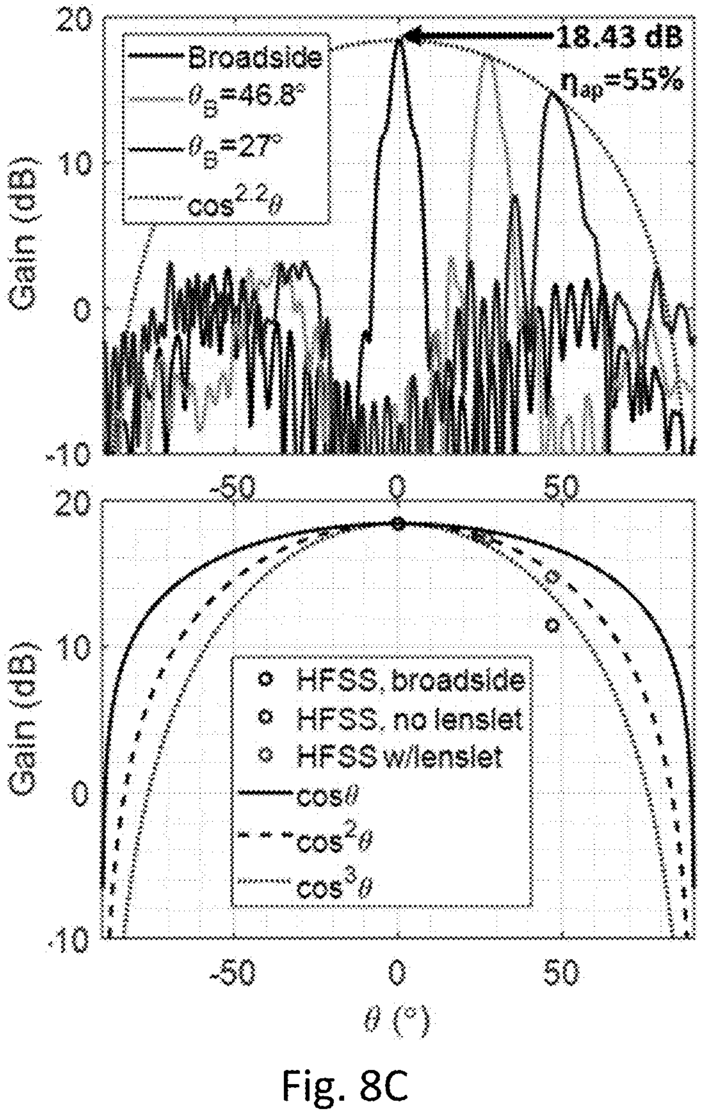
FIG. 8C shows gain over beam scan with the feed correction focal lenslet (top plot) and gain summary with scan loss exponents of 2 and 3 (bottom plot).

FIG. 8C shows gain over beam scan with the feed correction focal lenslet (top plot) and gain summary with scan loss exponents of 2 and 3 (bottom plot), which summarizes overall performance of the FCL design. As shown in FIG. 8C, broadside gain as well as the two beam scan angles (27° and 47°) are shown together with a scan loss curve of $\cos^{2.2}\theta$. On the bottom half of the figure the main beam gain with (blue marker) and without (red marker) FCLs are included and show that the FCL has a dramatic reduction in scan loss at extreme angles. A best fit of $\cos^n \theta$ was found for patterns with and without FCLs and it was found that a scan loss exponent of 3.0 fit the patterns without an FCL while a scan loss exponent of 2.0 fit the patterns with an FCL.

The present disclose demonstrates through full-wave electromagnetic simulation that the FCL design can dramatically reduce scan loss over extreme beam scan angles. In embodiments, incorporating phase predistortion in the FCL can further improve scan loss and correct aperture phase distortions which cause coma distortion and other undesirable significant sidelobes.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An electromagnetic antenna comprising:

a channel configured to serve as a waveguide for electromagnetic radiation;

a first and second feed disposed next to each other inside the channel at a first end thereof, the first and second feed being configured to radiate electromagnetic waves into the channel;

an aperture lens disposed inside the channel near a second end thereof opposite to the first end, the aperture lens being configured to output collimated beams;

a first focal lens disposed inside the channel adjacent to an outlet of the first feed, the first focal lens being configured to squint a beam radiated from the first feed toward a center of the aperture lens; and a second focal lens disposed inside the channel adjacent to an outlet of the second feed, the second focal lens being configured to squint a beam radiated from the second feed toward the center of the aperture lens.

2. The electromagnetic antenna of claim 1, wherein the channel is formed by two parallel plates.

3. The electromagnetic antenna of claim 2, wherein the two parallel plates are spaced apart by less than 1λ, where λ is a wavelength of a signal provided to the first and second feed.

4. The electromagnetic antenna of claim 3, wherein the channel has one or more bends between the first focal lens and the aperture lens.

5. The electromagnetic antenna of claim 4, wherein at least one of the one or more bends is 90°.

6. The electromagnetic antenna of claim 3, wherein the channel is wider at the first end than in a middle section.

7. The electromagnetic antenna of claim 3, wherein channel has a flared outlet at the second end.

8. The electromagnetic antenna of claim 1, wherein the aperture lens has a surface curvature and a gradient-index (GRIN) profile.

9. An electromagnetic antenna comprising:

a channel formed by two parallel plates and configured to serve as a waveguide for electromagnetic radiation;

a first feed disposed inside the channel at a first end thereof, the first feed being configured to radiate electromagnetic waves into the channel;

an aperture lens disposed inside the channel near a second end thereof opposite to the first end; and a focal lens disposed inside the channel at a predetermined location between the first feed and the aperture lens, the focal lens being configured to squint a beam radiated from the first feed toward a center of the aperture lens, wherein the aperture lens outputs collimated beams.

10. The electromagnetic antenna of claim 9, wherein the two parallel plates are spaced apart by less than 1λ, where λ is a wavelength of a signal provided to the feed.

11. The electromagnetic antenna of claim 10, wherein the channel has one or more bends between the focal lens and the aperture lens.

12. The electromagnetic antenna of claim 11, wherein at least one of the one or more bends is 90°.

13. The electromagnetic antenna of claim 10, wherein the channel is narrower at the predetermined location than at the first end.

14. The electromagnetic antenna of claim 10, wherein channel has a flared outlet at the second end.

15. The electromagnetic antenna of claim 9, wherein the aperture lens has a surface curvature and a gradient-index (GRIN) profile.

16. The electromagnetic antenna of claim 9 further comprising a plurality of feeds including the first feed forming a feed array disposed at the first end of the channel.

17. An electromagnetic antenna comprising:

two parallel plates spaced apart by a predetermined distance less than 1λ wherein λ is a wavelength of a radiation by the electromagnetic antenna, the two parallel plates forming a channel serving as a waveguide for the electromagnetic radiation and producing a two-dimensional radiation pattern;

a first feed disposed inside the channel at a first end thereof, the first feed being configured to radiate electromagnetic waves into the channel;

a lens disposed inside the channel at a predetermined location between the first feed and a second end of the channel.

18. The electromagnetic antenna of claim 17, wherein the channel is narrower at the predetermined location than at the first end.

19. The electromagnetic antenna of claim 17, wherein channel has a flared outlet at the second end.

20. The electromagnetic antenna of claim 17 further comprising a plurality of feeds including the first feed forming a feed array at the first end of the channel.

* * * * *